United States Patent
Wu

(10) Patent No.: US 10,892,903 B2
(45) Date of Patent: Jan. 12, 2021

(54) COMMUNICATION SYSTEM CAPABLE OF PRESERVING A CHIP-TO-CHIP INTEGRITY

(71) Applicant: eMemory Technology Inc., Hsin-Chu (TW)

(72) Inventor: Meng-Yi Wu, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 135 days.

(21) Appl. No.: 16/378,534

(22) Filed: Apr. 8, 2019

(65) Prior Publication Data
US 2019/0372787 A1 Dec. 5, 2019

Related U.S. Application Data

(60) Provisional application No. 62/677,196, filed on May 29, 2018.

(51) Int. Cl.
*H04L 29/06* (2006.01)
*H04L 9/32* (2006.01)
(Continued)

(52) U.S. Cl.
CPC .......... *H04L 9/3278* (2013.01); *H04L 9/0631* (2013.01); *H04L 9/0838* (2013.01); *H04L 9/0894* (2013.01)

(58) Field of Classification Search
None
See application file for complete search history.

(56) References Cited

U.S. PATENT DOCUMENTS 6,718,467 B1 * 4/2004 Trostle .................. H04L 9/0844
380/281
7,592,829 B2 * 9/2009 Walmsley ............ B41J 2/04505
326/8

(Continued)

FOREIGN PATENT DOCUMENTS

TW          I524718 B       3/2016
WO     2011/089143 A1      7/2011

OTHER PUBLICATIONS

Kukreja, Sonal et al. Random Grid Based Extended Visual Secret Sharing Scheme for Image Authentication. 2018 8th International Conference on Cloud Computing, Data Science & Engineering (Confluence). https://ieeexplore.ieee.org/stamp/stamp.jsp?tp=&arnumber=8442463 (Year: 2018).*

(Continued)

*Primary Examiner* — Jeremiah L Avery
(74) *Attorney, Agent, or Firm* — Winston Hsu

(57) ABSTRACT

A communication system includes a first communication system and a second communication terminal. The first communication terminal generates a first shared key, and the second communication terminal generates a second shared key. During an exchange operation, the first communication terminal stores the second shared key of the second communication terminal, and the second communication terminal stores the first shared key of the first communication terminal. During a challenge operation, the first communication terminal sends a challenge string to the second communication terminal, the second communication terminal generates a response string by performing reversible encryption operations to the challenge string with the first shared key and the second shared key, the second communication terminal sends the response string to the first (Continued)

communication terminal, and the first communication terminal verifies the response string.

20 Claims, 4 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 8,363,835 B2* | 1/2013 | Hori | H04L 9/3263 |
| | | | 380/255 |
| 9,038,154 B2 | 5/2015 | Lord | |
| 2008/0069338 A1 | 3/2008 | Relyea | |
| 2011/0138192 A1* | 6/2011 | Kocher | H04L 9/3247 |
| | | | 713/189 |
| 2015/0143125 A1* | 5/2015 | Nix | H04L 9/0841 |
| | | | 713/171 |
| 2016/0006570 A1 | 1/2016 | Falk | |

OTHER PUBLICATIONS

Baker, Bradley; Chow, C. Edward. HTEE: An HMAC based Tamper Evident Encryption. 2010 International Conference on Security and Cryptography (Secrypt). https://ieeexplore.ieee.org/stamp/stamp.jsp?tp=&arnumber=5741647 (Year: 2010).*

A. Menezes et al., Chapter 12: Key Establishment Protocols, Handbook of Applied Cryptography, 1996, coverpage & pp. 489-541, XP001525012, CRC Press.

A. Menezes et al., Chapter 10: Identification and Entity Authentication, Handbook of Applied Cryptography, 1996, coverpage & pp. 385-424, XP001525010, CRC Press.

Emad Hamadaqa et al., Clone-Resistant Vehicular RKE by Deploying SUC, 2017 Seventh International Conference on Emerging Security Technologies (EST), 2017, pp. 221-225, XP033244310.

* cited by examiner

COMMUNICATION SYSTEM CAPABLE OF PRESERVING A CHIP-TO-CHIP INTEGRITY

CROSS REFERENCE TO RELATED APPLICATIONS

This non-provisional application claims priority of U.S. provisional application No. 62/677,196, filed on May 29, 2018, included herein by reference in its entirety.

BACKGROUND OF THE INVENTION

1. Field of the Invention

The present invention is related to a communication system, and more particularly, to a communication system capable of preserving a chip-to-chip integrity.

2. Description of the Prior Art

As the function of electronic devices become more complicate, the electronic devices usually include blocks and chips with different functions. However, if the behavior of a chip can be recorded and analyzed during the communications with other chips by a competitor, then the competitor will be able replace the chip with their own product by simulating the behavior of the chip.

Especially in the application of the Internet of Things (IoT), when chips and/or blocks designed by different companies have to communicate with each other, the information safety would become a great concern. For example, if the chip in a host terminal has been replaced, the counterfeit chip may even take control of other client devices in the IoT system, causing chaos to the system.

To prevent this issue, verification for communications between chips or blocks is usually required. In prior art, the asymmetric verification schemes using identical private key and elliptic curve cryptography (ECC) are usually applied to achieve better protection. However, the complicate computations required by ECC will increase the circuit area for additional hardware components and delay the communication.

SUMMARY OF THE INVENTION

One embodiment of the present invention discloses a communication system. The communication system includes a first communication terminal and a second communication terminal.

The first communication terminal generates a first shared key by performing a first reversible encryption operation to a first root key and a second root key. The second communication terminal generates a second shared key by performing a second reversible encryption operation to a third root key and a fourth root key.

During an exchange operation, the first communication terminal stores the second shared key of the second communication terminal, and the second communication terminal stores the first shared key of the first communication terminal.

During a challenge operation, the first communication terminal sends a challenge string to the second communication terminal, the second communication terminal generates a response string by performing a third reversible encryption operation and a fourth reversible encryption to the challenge string, the third reversible encryption operation is performed with the first shared key, and the fourth reversible encryption operation is performed with the second shared key, the second communication terminal sends the response string to the first communication terminal, and the first communication terminal verifies the response string.

Another embodiment of the present invention discloses a method for operating a communication system. The communication system includes a first communication terminal and a second communication terminal.

The method includes the first communication terminal generating a first shared key by performing a first reversible encryption operation to a first root key and a second root key, and the second communication terminal generating a second shared key by performing a second reversible encryption operation to a third root key and a fourth root key.

During an exchange operation, the first communication terminal stores the second shared key of the second communication terminal, and the second communication terminal stores the first shared key of the first communication terminal. During a challenge operation, the first communication terminal sends a challenge string to the second communication terminal, the second communication terminal generates a response string by performing a third reversible encryption operation and a fourth reversible encryption to the challenge string, the third reversible encryption operation is performed with the first shared key, and the fourth reversible encryption operation is performed with the second shared key, the second communication terminal sends the response string to the first communication terminal, and the first communication terminal verifies the response string.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
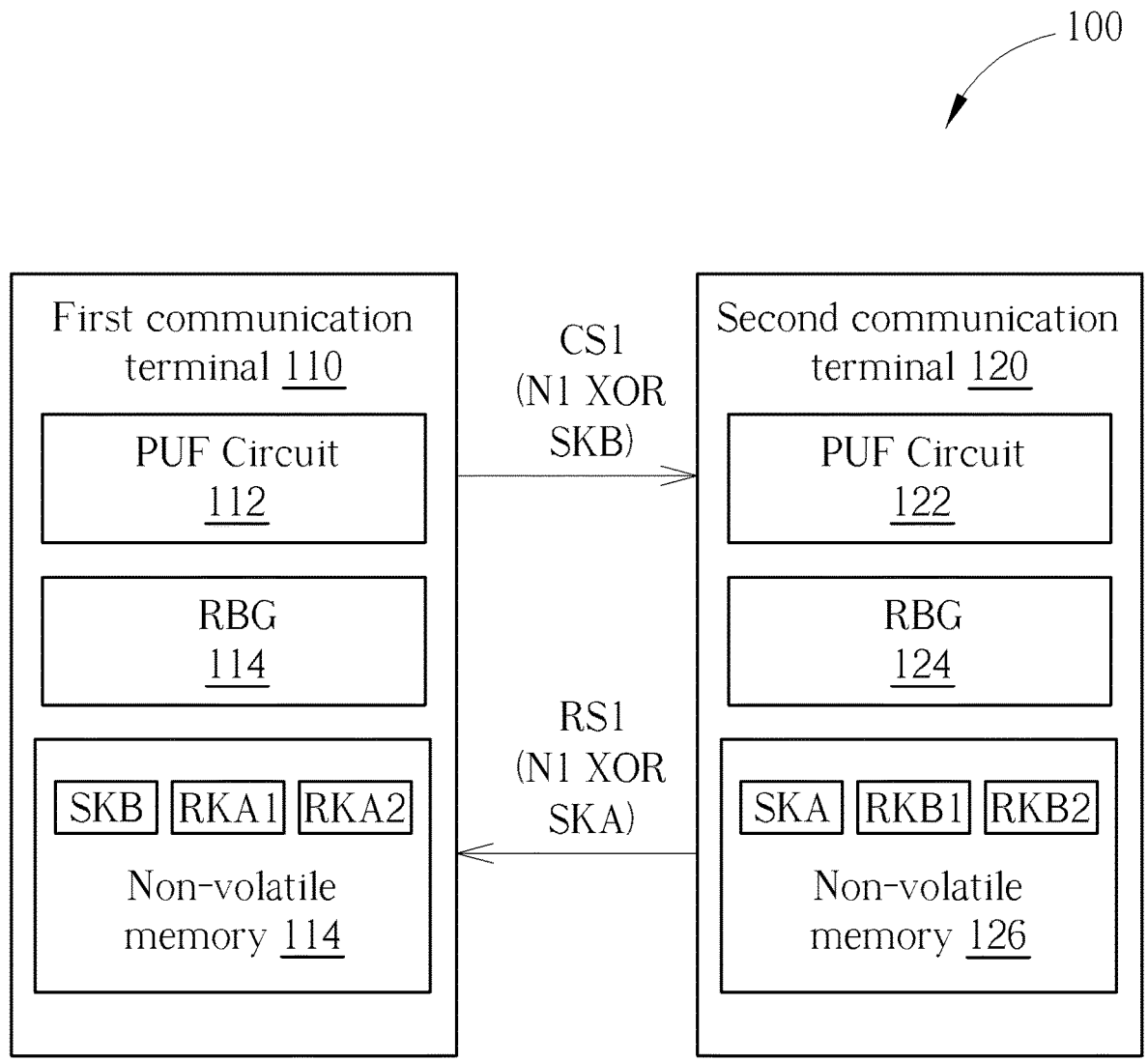
FIG. 1 shows a communication system according to one embodiment of the present invention.

FIG. 1 shows a communication system 100 according to one embodiment of the present invention. The communication system 100 includes a first communication terminal 110 and a second communication terminal 120. Before the first communication terminal 110 communicates with the second communication terminal 120, the first communication terminal 110 and the second communication terminal 120 may verify each other for the authentication.

The first communication terminal 110 can generate a shared key SKA by performing a reversible encryption operation to two root keys RKA1 and RKA2. In some embodiments, the first communication terminal 110 can include a physical unclonable function (PUF) circuit 112 for providing random bits. Since the random bits generated by the PUF circuit 112 are related to uncontrollable random physical characteristics caused in the manufacturing process of the PUF circuit 112, the random bits are unpredictable, and can be a good source for producing the root keys.

In FIG. 1, the first communication terminal 110 can generate the root keys RKA1 and RKA2 according to a plurality of random bits provided by the PUF circuit 112. For example, the first communication terminal 110 can further include a random bit generator (RBG) 114. The RBG 114 can be coupled to the PUF circuit 112, and can generate a random access scheme to retrieve the plurality of random bits stored in the PUF circuit 112. In some embodiments, the RBG 114 can be a deterministic random bit generator (DRBG) or a true random number generator (TRNG). Consequently, the root keys RKA1 and RKA2 would be unique and unpredictable, improving the security of the communication system 100. In addition, the first communication terminal 110 can further include a non-volatile memory 116 for storing the root keys RKA1 and RKA2, and the shared key SKB.

Similarly, the second communication terminal 120 can generate a second shared key SKB by performing a reversible encryption operation to two root keys RKB1 and RKB2. Also, the second communication terminal 120 can generate the root keys RKB1 and RKB2 with a PUF circuit 122 and a deterministic random bit generator 124, and store the root keys RKB1 and RKB2, and the shared key SKA in a non-volatile memory 126.

In some embodiments, the communication system 100 can perform an exchange operation to have the communications terminals 110 and 120 exchange their shared keys SKA and SKB before usage. That is, during the exchange operation, the first communication terminal 110 can store the shared key SKB of the second communication terminal 120, and the second communication terminal 120 can store the shared key SKA of the first communication terminal 110. Therefore, the communication terminals 110 and 120 will be able to verify each other before authenticate the communication between these two terminals when being used in the actual application in the future.

In some embodiments, the exchange operation can be performed in a safe environment, for example, in the manufacturing factory, so that the information of the shared keys SKA and SKB can be protected.

In this case, before the communication system 100 starts a communication to exchange information between the first communication terminal 110 and the second communication terminal 120, the communication system 100 can perform a challenge operation. In FIG. 1, the challenge operation can be initiated by the first communication terminal 110.

For example, during the challenge operation, the first communication terminal 110 can send a challenge string CS1 to the second communication terminal 120. In some embodiments, the first communication terminal 110 can generate the challenge string CS1 by performing a reversible encryption operation, such as an XOR operation, to a number used once N1 (Nonce) and the shared key SKB. That is, the challenge string CS1 can be represented as (N1)XOR(SKB).

After receiving the challenge string CS1, the second communication terminal 120 can generate a response string RS1 by performing the corresponding reversible encryption operations to the challenge string CS1 with the shared keys SKA and SKB. In this case, the reversible encryption operations would be exclusive OR (XOR) operations; therefore, the response string RS1 can be represented as (CS1)XOR(SKB)XOR(SKA), which equals to (N1)XOR(SKA).

Afterwards, the second communication terminal 120 can send the response string RS1 to the first communication terminal 110, and the first communication terminal 110 will verify the response string RS1 for authentication. For example, the first communication terminal 110 can perform an XOR operation to the response string RS1 with the number used once N1 first. In this case, if the second communication terminal 120 has stored the correct shared key SKA of the first communication terminal 110, and the first communication terminal 110 has stored the correct shared key SKB of the second communication terminal 120, then the result of the XOR operation to the response string RS1 with the number used once N1 will be the shared key SKA. In some embodiments, the first communication terminal 110 can further verify the shared key SKA by performing an XOR operation with the root key RKA2. If the result of the XOR operation is equal to the root key RKA1, then the challenge operation will be verified as valid, and the first communication terminal 110 would authenticate the second communication terminal 120 so the communication can be started.

In the present embodiment, since the challenge string CS1 and the response string RS1 are protected by two different shared keys, it would be very difficult for the competitor to retrieve either one of these two keys by recording and analyzing the transmitting data. Furthermore, by verifying the shared key SKA with the root keys RKA1 and RKA2 in the first communication terminal 110, the verification can be even more solid. Therefore, the communication between the first communication terminal 110 and the second communication terminal 120 can be verified effectively, and the communication security of the communication system 100 can be improved.

In some embodiments, the first communication terminal 110 can be a host device, and the second communication terminal 120 can be a slave device receiving the commands from the host device. However, in some other embodiments, the second communication terminal 120 can be the host device, and the first communication terminal 110 can be the slave device.

Figure 2:
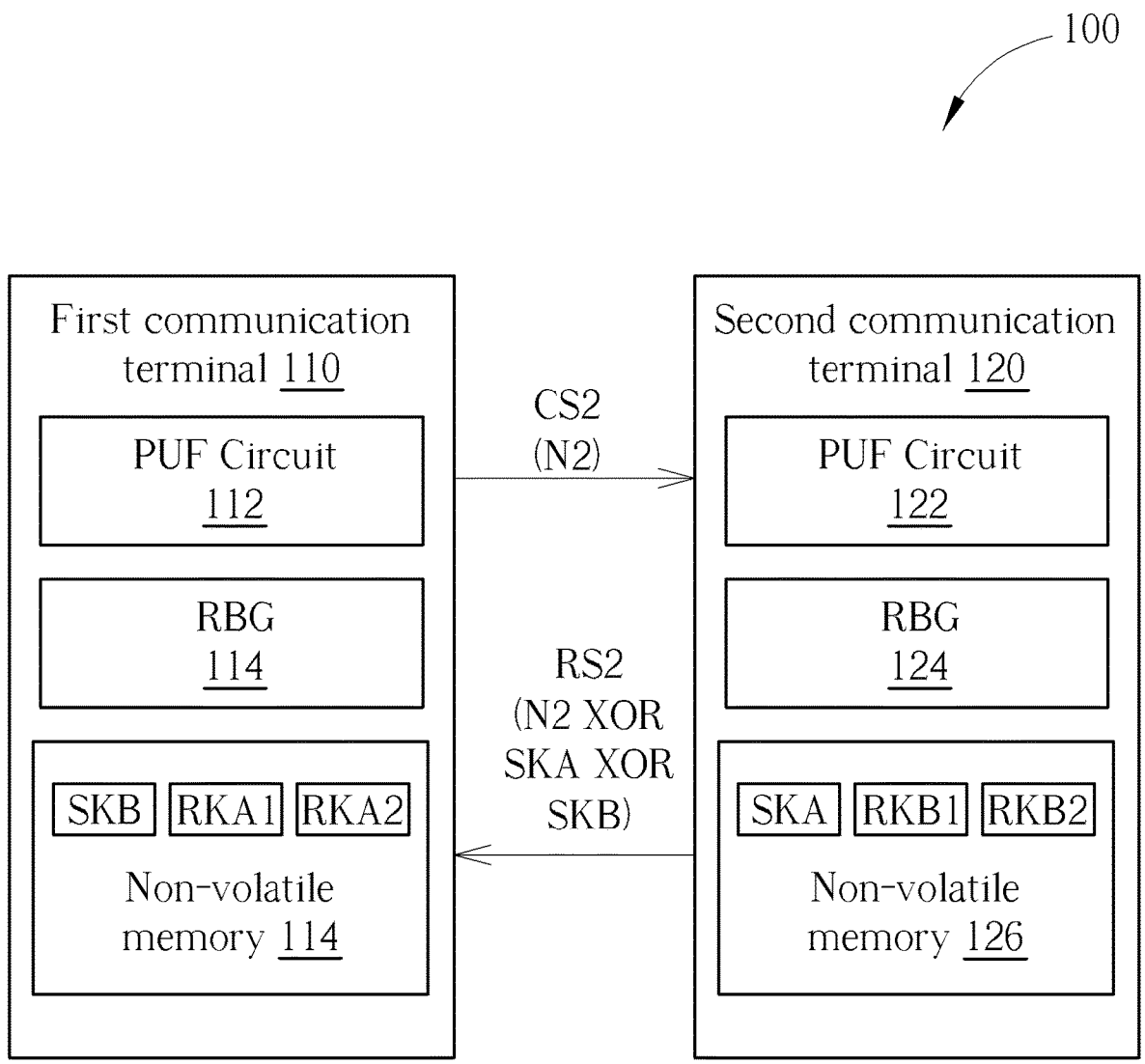
FIG. 2 shows a usage scheme of the communication system in FIG. 1 according to one embodiment of the present invention.

Also, in some embodiments, the first communication terminal 110 can generate the challenge string CS1 with a different method. FIG. 2 shows another usage scheme of the communication system 100 according to one embodiment of the present invention.

In FIG. 2, the challenge string CS2 generated by the first communication terminal 110 is a number used once N2. In this case, the second communication terminal 120 can still perform XOR operations with the shared keys SKA and SKB to generate the response string RS2. For example, the response string RS2 can be represented as (N2)XOR(SKA)XOR(SKB).

After receiving the response string RS2, the first communication terminal 110 can perform XOR operations to the response string RS2 with the number used once N2 and the shared key SKB to retrieve the shared key SKA, and can further perform an XOR operation with the root key RKA2 to retrieve the root key RKA1 for verification.

In the embodiment shown in FIG. 2, since the challenge operation is still performed with two different shared keys SKA and SKB, it would be very difficult for the competitor to retrieve either of keys by recording and analyzing the challenge string CS2 and the response string RS2. Furthermore, by verifying the shared key SKA with the root keys RKA1 and RKA2, the verification can be even more solid.

Figure 3:
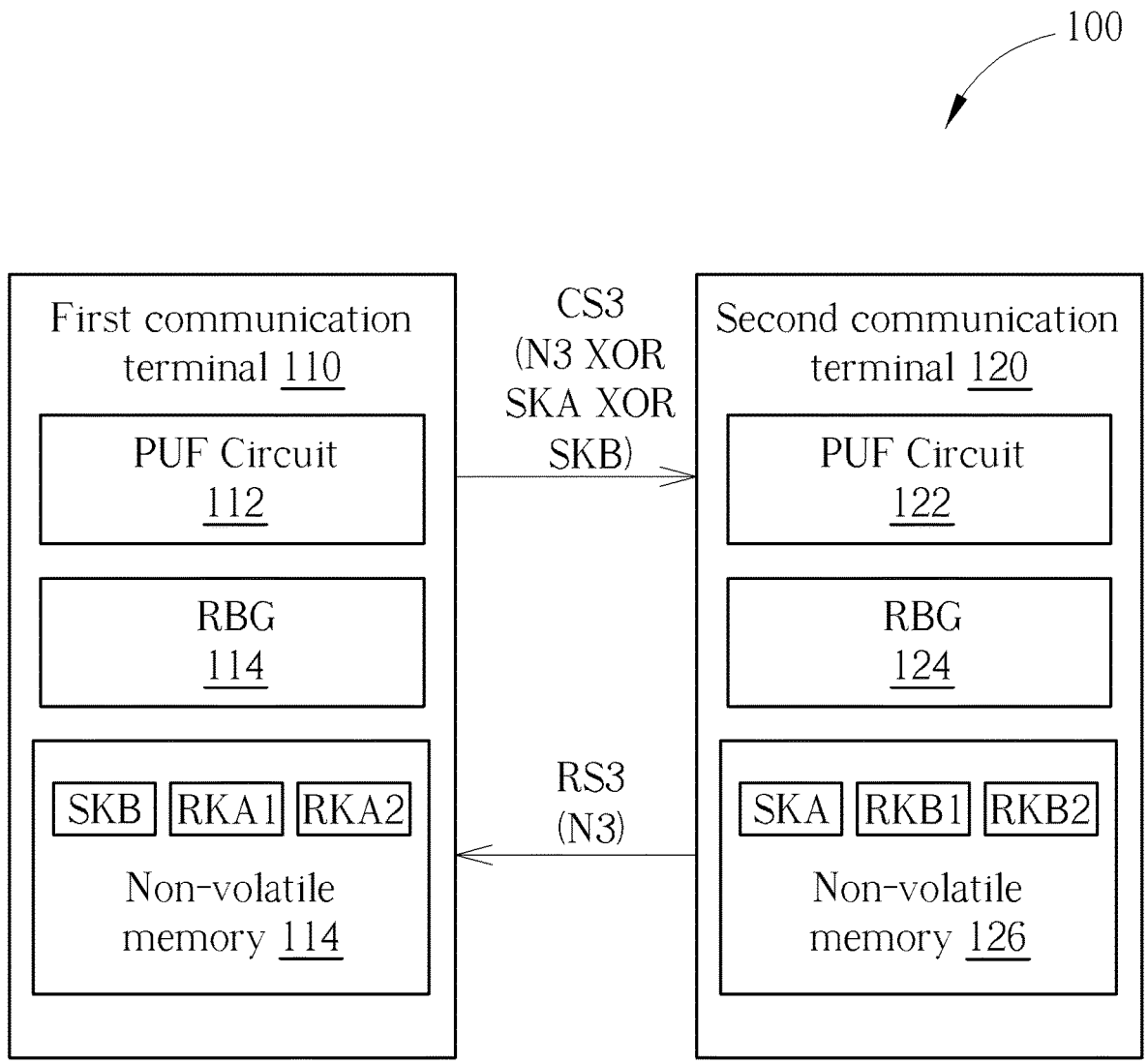
FIG. 3 shows a usage scheme of the communication system in FIG. 1 according to another embodiment of the present invention.

FIG. 3 shows a usage scheme of the communication system 100 according to another embodiment of the present invention. In FIG. 3, the first communication terminal 110 can perform XOR operations to a number used once N3 with the shared keys SKA and SKB to generate the challenge string CS3. In this case, the second communication terminal 120 will also perform XOR operations to the challenge string CS3 with the shared key SKB and SKA to generate the response string RS3. If the shared key SKB and SKA are correct, then the response string RS3 will be equal to the number used once N3 sent by the first communication terminal 110. Consequently, the first communication terminal 110 will compare the response string RS3 and the number used once N3 for verification.

Since the challenge operation is performed with two different shared keys SKA and SKB, it would be very difficult for the competitor to retrieve either of keys by recording and analyzing the challenge string CS3 and the response string RS3. Therefore, the communication between the first communication terminal 110 and the second communication terminal 120 can be verified effectively, and the communication security of the communication system 100 can be improved.

In addition, in the aforementioned embodiments, the shared keys SKA, SKB, the challenge strings CS1 to CS3, and the response strings RS1 to RS3 can be generated by XOR operations; however, in some other embodiments, the shared keys SKA, SKB, the challenge strings CS1 to CS3, and the response strings RS1 to RS3 may be generated with other types of reversible encryption operations. For example, the XOR operations can be replaced by operations following the advance encryption standard (AES) according to the system requirement.

Moreover, in FIGS. 1 to 3, the challenge operations are initiated by the first communication terminal 110, however, in some other embodiments, the second communication terminal 120 can also initiate the challenge operations by sending the challenge string to the first communication terminal 110, and the challenge operation can follow similar approaches aforementioned. In addition, in some embodiments, to further enhance the verification between the communication terminals 110 and 120, both of the communication terminals 110 and 120 can initiate the challenge operations for double verification.

Figure 4:
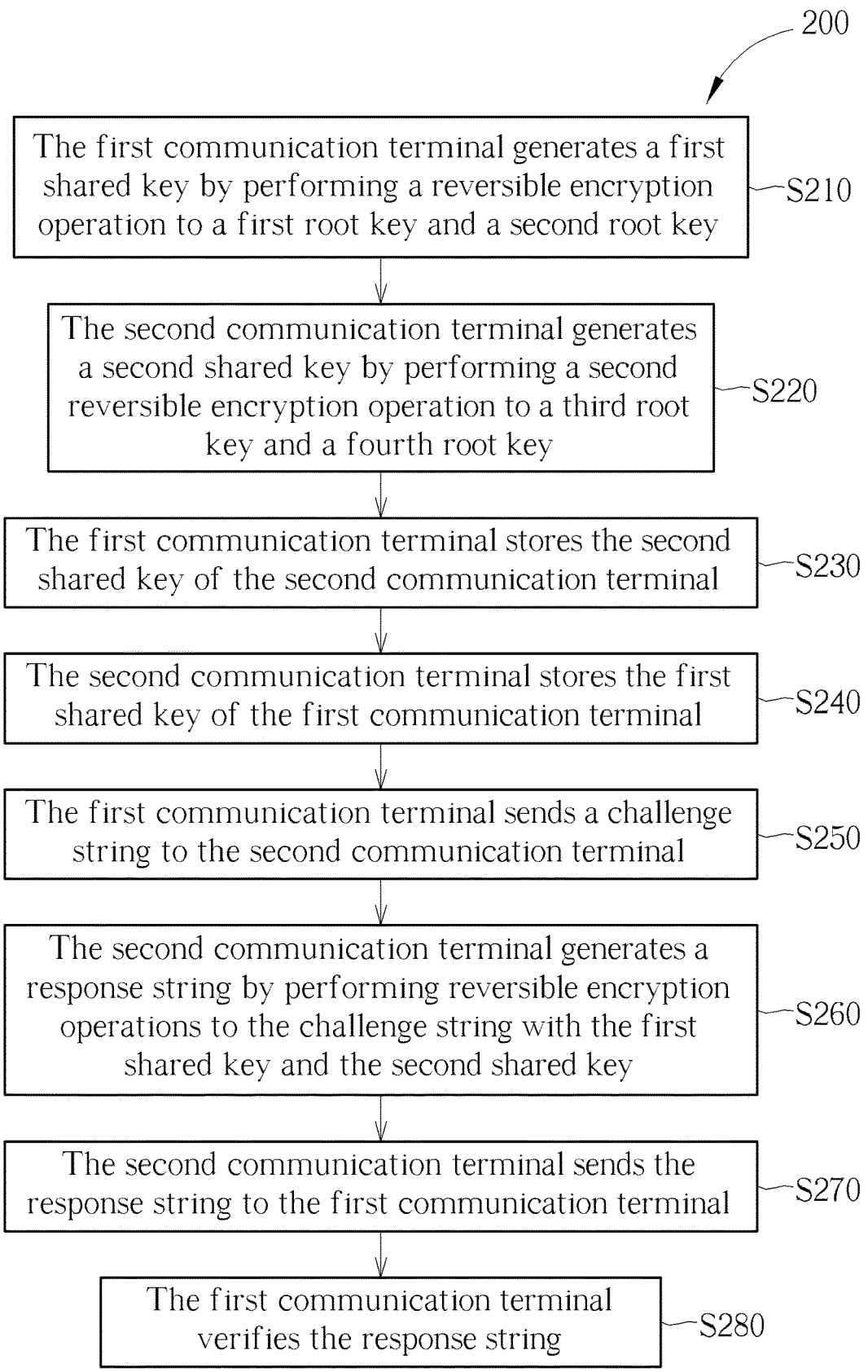
FIG. 4 shows a method for operating the communication system in FIG. 1 according to one embodiment of the present invention.

FIG. 4 shows a method 200 for operating the communication system 100 according to one embodiment of the present invention. The method 200 includes steps S210 to S280, but is not limited to the order shown in FIG. 4.

S210: the first communication terminal 110 generates a shared key SKA by performing a reversible encryption operation to root keys RKA1 and RKA2;

S220: the second communication terminal 120 generates a shared key SKB by performing a second reversible encryption operation to root keys RKB1 and RKB2;

S230: the first communication terminal 110 stores the shared key SKB of the second communication terminal 120;

S240: the second communication terminal 120 stores the shared key SKA of the first communication terminal 110;

S250: the first communication terminal 110 sends a challenge string to the second communication terminal 120;

S260: the second communication terminal 120 generates a response string by performing reversible encryption operations to the challenge string with the shared keys SKA and SKB;

S270: the second communication terminal 120 sends the response string to the first communication terminal 110;

S280: the first communication terminal 110 verifies the response string.

After the first communication terminal 110 and the second communication terminal 120 generate the shared keys SKA and SKB respectively, the first communication terminal 110 and the second communication 120 will exchange and store the shared keys in step S230 and S240 during the exchange operation.

In this case, the first communication terminal 110 and the second communication terminal 120 can generate the challenge string and the response string with the two shared keys SKA and SKB during the challenge operation. For example, the challenge string sent by the first communication terminal 110 in step S250 can be generated by performing an XOR operation to the number used once N1 and the shared key SKB as the challenge string CS1 shown in FIG. 1. In this case, the response string RS1 generated by the second communication terminal in step S260 would be equal to (N1)XOR(SKA). Therefore, the first communication terminal 110 can further perform the XOR operations to the response string RS1 with the number used once N1 and the root key RKA2 and check if the result is equal to the root key RKA1 for verification.

However, the first communication terminal 110 may generate the challenge string with different content. For example, the first communication terminal 110 may generate the challenge string CS2 with the number used once N2 as shown in FIG. 2. In this case, the second communication terminal 120 will also perform step S260 to generate the response string RS2, that is, the second communication terminal 120 can perform the XOR operations to the challenge string CS2 with the shared keys SKA and SKB, to generate the response string RS2 (e.g. N2 XOR SKA XOR SKB). Therefore, the first communication terminal 110 can further perform the XOR operations to the response string RS2 with the shared key SKB, the number used once N2, and the root key RKA2 to check if the result is equal to the root key RKA1 in step S280.

Similarly, the first communication terminal 110 may generate the challenge string CS3 as shown in FIG. 3, that is, (N3) XOR (SKA) XOR (SKB). In this case, the second communication terminal 120 will also perform step S260 to generate the response string RS3. For example, the second communication terminal can perform the XOR operations to the challenge string CS3 with the shared keys SKA and SKB to generate the response string RS3. The first communication terminal 110 can further check if the response string RS3 is equal to the number used once N3 for authentication in step S280.

In method 200, since the challenge operation is performed with two different shared keys SKA and SKB, it would be very difficult for the competitor to retrieve either of keys by recording and analyzing the challenge string and the response string. Furthermore, by verifying the shared key SKA with the root keys RKA1 and RKA2, the authentication can be even more solid.

In summary, the communication system and the method for operating the communication system provided by the embodiments of the present invention can perform the verification with two shared keys. Therefore, the verification process can be performed with simpler operations, such as exclusive or operations, and without complicate computations, while the communication can still be secured. Furthermore, since the shared key can be further verified with the root key in the communication terminal, the verification can be even more solid.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication system comprising:
a first communication terminal configured to generate a first shared key by performing a first reversible encryption operation to a first root key and a second root key;
a second communication terminal configured to generate a second shared key by performing a second reversible encryption operation to a third root key and a fourth root key;
wherein:
during an exchange operation:
the first communication terminal stores the second shared key of the second communication terminal; and
the second communication terminal stores the first shared key of the first communication terminal; and
during a challenge operation:
the first communication terminal sends a challenge string to the second communication terminal;
the second communication terminal generates a response string by performing a third reversible encryption operation and a fourth reversible encryption to the challenge string, wherein the third reversible encryption operation is performed with the first shared key, and the fourth reversible encryption operation is performed with the second shared key;
the second communication terminal sends the response string to the first communication terminal; and
the first communication terminal verifies the response string.

2. The communication system of claim 1, wherein:
the first communication terminal comprises:
a physical unclonable function (PUF) circuit configured to provide random bits;
the first communication terminal is further configured to generate the first root key and the second root key according to a plurality of random bits provided by the PUF circuit.

3. The communication system of claim 2, wherein:
the first communication terminal further comprises:
a deterministic random bit generator coupled to the PUF circuit, and configured to generate a random access scheme to retrieve the plurality of random bits stored in the PUF circuit.

4. The communication system of claim 2, wherein:
the first communication terminal further comprises:
a non-volatile memory configured to store the first root key, the second root key, and the second shared key.

5. The communication system of claim 1, wherein:
the first reversible encryption operation, the second reversible encryption operation, the third reversible encryption operation, and the fourth reversible encryption operation are exclusive OR (XOR) operations or operations following an advance encryption standard (AES).

6. The communication system of claim 1, wherein:
the first communication terminal performs an XOR operation to a number used once (Nonce) and the second shared key to generate the challenge string; and
the fourth encryption operation is an XOR operation.

7. The communication system of claim 6, wherein:
the third encryption operation is an XOR operation;
the first communication terminal performs XOR operations to the response string with the number used once and the second root key to retrieve the first root key for verification.

8. The communication system of claim 1, wherein:
the challenge string is a number used once.

9. The communication system of claim 8, wherein:
the third encryption operation and the fourth encryption operation are XOR operations; and
the first communication terminal performs XOR operations to the response string with the number used once, the second shared key, and the second root key to retrieve the first root key for verification.

10. The communication system of claim 1, wherein:
the first communication terminal performs XOR operations to a number used once with the first shared key and the second shared key to generate the challenge string.

11. The communication system of claim 10, wherein:
the third encryption operation and the fourth encryption operation are XOR operations; and
the first communication terminal compares the response string and the number used once for verification.

12. A method for operating a communication system, the communication system comprising a first communication terminal and a second communication terminal, and the method comprising:
the first communication terminal generating a first shared key by performing a first reversible encryption operation to a first root key and a second root key;
the second communication terminal generating a second shared key by performing a second reversible encryption operation to a third root key and a fourth root key;
during an exchange operation:
the first communication terminal storing the second shared key of the second communication terminal; and
the second communication terminal storing the first shared key of the first communication terminal; and
during a challenge operation:
the first communication terminal sending a challenge string to the second communication terminal;
the second communication terminal generating a response string by performing a third reversible encryption operation and a fourth reversible encryption to the challenge string, wherein the third reversible encryption operation is performed with the first shared key, and the fourth reversible encryption operation is performed with the second shared key;
the second communication terminal sending the response string to the first communication terminal; and
the first communication terminal verifying the response string.

13. The method of claim 12, wherein:
the first reversible encryption operation, the second reversible encryption operation, the third reversible encryption operation, and the fourth reversible encryption operation are exclusive OR (XOR) operations or operations following an advance encryption standard (AES).

14. The method of claim 12, further comprising:
the first communication terminal performing an XOR operation to a number used once (Nonce) and the second shared key to generate the challenge string;
wherein the fourth encryption operation is an XOR operation.

15. The method of claim 14, wherein:
the third encryption operation is an XOR operation;
the first communication terminal verifying the response string comprises the first communication terminal performing XOR operations to the response string with the number used once and the second root key to retrieve the first root key for verification.

16. The method of claim 12, wherein:
the challenge string is a number used once.

17. The method of claim 16, wherein:
the third encryption operation and the fourth encryption operation are XOR operations; and
the first communication terminal verifying the response string comprises the first communication terminal performing XOR operations to the response string with the number used once, the second shared key, and the second root key to retrieve the first root key for verification.

18. The method of claim 12, further comprising:
the first communication terminal performing XOR operations to a number used once with the first shared key and the second shared key to generate the challenge string.

19. The method of claim 18, wherein:
the third encryption operation and the fourth encryption operation are XOR operations; and
the first communication terminal verifying the response string comprises the first communication terminal comparing the response string and the number used once for verification.

20. The method of claim 12, wherein the first communication terminal comprises a physical unclonable function (PUF) circuit, and the method further comprises:
generating the first root key and the second root key by combining a plurality of random bits provided by the PUF circuit.

* * * * *